US010413883B2

(12) United States Patent
Bakr et al.

(10) Patent No.: US 10,413,883 B2
(45) Date of Patent: Sep. 17, 2019

(54) CATALYTIC STRUCTURES AND METHODS OF GENERATING HYDROGEN GAS

(71) Applicants: KING ABDULLAH UNIVERSITY OF SCIENCE AND TECHNOLOGY, Thuwal (SA); Saudi Basic Industries Corporation, Riyadh (SA)

(72) Inventors: Osman M. Bakr, Thuwal (SA); Lutfan Sinatra, Thuwal (SA); Shahid M. Bashir, Riyadh (SA); Khabiboulakh Katsiev, Riyadh (SA); Hicham Idriss, Riyadh (SA)

(73) Assignees: KING ABDULLAH UNIVERSITY OF SCIENCE AND TECHNOLOGY, Thuwal (SA); SABIC GLOBAL TECHNOLOGIES B.V., AC Bergen OP Zoom (NL)

( * ) Notice: Subject to any disclaimer, the term of this patent is extended or adjusted under 35 U.S.C. 154(b) by 1 day.

(21) Appl. No.: 15/501,683

(22) PCT Filed: Aug. 4, 2015

(86) PCT No.: PCT/IB2015/001832
§ 371 (c)(1),
(2) Date: Feb. 3, 2017

(87) PCT Pub. No.: WO2016/020759
PCT Pub. Date: Feb. 11, 2016

(65) Prior Publication Data
US 2017/0225150 A1 Aug. 10, 2017

Related U.S. Application Data

(60) Provisional application No. 62/032,672, filed on Aug. 4, 2014.

(51) Int. Cl.
*B01J 21/06* (2006.01)
*B01J 23/72* (2006.01)
(Continued)

(52) U.S. Cl.
CPC ............. *B01J 21/063* (2013.01); *B01J 23/72* (2013.01); *B01J 35/002* (2013.01); *B01J 35/004* (2013.01);
(Continued)

(58) Field of Classification Search
CPC ....................................................... B01J 21/063
See application file for complete search history.

(56) References Cited

U.S. PATENT DOCUMENTS

2010/0304204 A1* 12/2010 Routkevitch ........... C01B 3/042
429/122
2011/0082026 A1* 4/2011 Sakatani ................ B01J 21/063
502/159
2013/0168228 A1 7/2013 Ozin

FOREIGN PATENT DOCUMENTS

CN 102 513 129 A 6/2012
JP 2014046236 A 3/2014

OTHER PUBLICATIONS

Cu2O Film via Hydrothermal Redox Approach: Morphology and Photocatalytic Performance Lun Pan et al. J. Phys. Chem., vol. 118, pp. 16335-16343 (Year: 2013).*
(Continued)

*Primary Examiner* — Douglas B Call
(74) *Attorney, Agent, or Firm* — Billion & Armitage; Benjamin C. Armitage (57) ABSTRACT

The present disclosure is directed to providing stable highly active catalysts for use in production of hydrogen from water.

16 Claims, 3 Drawing Sheets

(51) Int. Cl.
C25B 1/00 (2006.01)
B01J 35/00 (2006.01)
B82Y 30/00 (2011.01)

(52) U.S. Cl.
CPC ......... B01J 35/006 (2013.01); B01J 35/0013 (2013.01); B82Y 30/00 (2013.01); C25B 1/003 (2013.01); Y02E 60/368 (2013.01)

(56) References Cited

OTHER PUBLICATIONS

Plasmon-Enhanced Photocatalytic Properties of Cu2O Nanowire—Au Nanoparticle Assemblies Yanlin Pan et al. Langmuir, Vo 28, pp. 12304-12310 (Year: 2012).*
Size control of Au@Cu2O octahedra for excellent photocatalytic performance Lina Kong et al J Mater. Chem. vol. 22, pp. 719-724 (Year: 2012).*
Tailored Vapor-phase growth of CuxO-TiO2 (x=1,2) Nanonnaterials decorated with Au Particles. Davide Barreca et al Langmuir, V 27, pp. 6409-6417 (Year: 2011).*
International Search Report and Written Opinion of Application No. PCT/IB2015/001832 dated Jan. 19, 2016, 19 pages.
Sinatra L et al: "A Au/Cu20-Ti02system 1-20 for photo-catalytic hydrogen production. A pn-junction effect or a simple case of in situ reduct", Journal of Catalysis, vol. 322, Dec. 20, 2014 (Dec. 20, 2014), Dec. 20, 2014 (Dec. 20, 2014), pp. 109-117, XP029189319.
Socorro Oros-Ruiz et al: "Photocatalytic hydrogen production by Au-MxOy (MAg, Cu, Ni) catalysts supported on TiO2", Catalysis Communications, vol. 47, Mar. 1, 2014 (Mar. 1, 2014), pp. 1-6, XP055238865.
Liu Yiming et al: "Structure, morphology and photocatalytic activity of Cu20/Pt/Ti02three-layered nanocomposite films", Materials Science in Semiconductor Processing, vol. 21, Feb. 3, 2014 (Feb. 3, 2014), pp. 26-32, XP028625854.
J Li : "Prep a rat i on of highly photocatalytic active nano-size Ti02-Cu20 particle composites with a novel electrochemical method", Electrochemistry Communications, vol. 6, No. 9, Aug. 3, 2004 (Aug. 3, 2004), pp. 940-943, XP055238387.
Xu S et al: "Fabrication and comparison of highly efficient Cu incorporated Ti02 photocatalyst for hydrogen generation from water", International Journal of Hydrogen Energy, Elsevier Science Publishers B.V., Barking, GB, vol. 35, No. 11, Mar. 31, 2010 (Mar. 31, 2010), pp. 5254-5261, XP027060128.
Ying Zhang et al: "Shape Effects of Cu 2 0 Polyhedral Microcrystals on Photocatalytic Activity", Journal of Physical Chemistry C, vol. 114, No. 11, Feb. 25, 2010 (Feb. 25, 2010), pp. 5073-5079, XP055238391.
Haolan Xu et al: "Shape Evolution and Size-Controllable Synthesis of Cu 2 0 Octahedra and Their Morphology-Dependent Photocatalytic Properties", Journal of Physical Chemistry Part B: Condensed Matter, Materials, Surfaces, Interfaces & Biophysical, vol. 110, No. 28, Jun. 28, 2006 (Jun. 28, 2006), pp. 13829-13834, XP055238390.
Zhaoke Zheng et al: "Crystal Faces of Cu2 0 and Their Stabilities in Photocatalytic Reactions", Journal of Physical Chemistry C, vol. 113, No. 32, Jul. 6, 2009 (Jul. 6, 2009), pp. 14448-14453, XP055238393.
Petra E. De Jongh et al: "Cu20: a catalyst for the photochemical decomposition of water?", Chemical Communications—CHEMCOM, No. 12, Jan. 1, 1999 (Jan. 1, 1999), pp. 1069-1070, XP055238386.
Preethi V et al: "Photocatalytic hydrogen production", Materials Science in Semiconductor Processing, Elsevier Science Publishers B.V., Barking, UK, vol. 16, No. 3, Apr. 3, 2013 (Ape. 3, 2013), pp. 561-575, XP028533766.
Akihiko Kudo et al: "Heterogeneous photocatalyst materials for water splitting", Chemical Society Reviews, vol. 38, No. 1, Nov. 18, 2008 (Nov. 18, 2008), p. 253, XP055026883.
Baker, et al., "Electrochemical Photolysis of Water at a Semiconductor Electrode", Nature vol. 238, Jul. 7, 1972, 37-38.
Best, et al., "Nanotechnology for photolytic hydrogen production: Colloidal anodic oxidation", International Journal of Hydrogen Energy, 2009, 7562-7578.
Connelly, et al., "Photoreaction of Au/TiO2 for hydrogen production from renewables: a review on the synergistic effect between anatase and rutile phases of TiO2", Mater Renew Sustain Energy, 2012, 1-12.
Connellya, et al., "The photoreaction of TiO2 and Au/TiO2 single crystal and powder surfaces with organic adsorbates. Emphasis on hydrogen production from renewables", Green Chemistry, 2012, 260-280.
Cushing, et al., "Photocatalytic Activity Enhanced by Plasmonic Resonant Energy Transfer from Metal to Semiconductor", Journal of the American Chemical Society, 2012, 15033-15041.
Gerischer, "On the Stability of Semiconductor Electrodes Against Photodecomposition", J. Electroanal. Chem., 1977, 133-143.
Kohjiro, et al., "Novel polyene dyes for highly efficient dye-sensitized solar cells", ChemComm, The Royal Society of Chemistry, 2003, 252-253.
Korzhak, et al., "Photocatalytic hydrogen evolution over mesoporous TiO2/metal nanocomposites", Journal of Phtochemistry and Photobiology A: Chemistry, 2008, 126-134.
Kotaro, et al., "Structural and Electrical Characterizations of Electrodeposited p-Type Semiconductor Cu2O Films", ECS, Journal of the Electrochemical Society, 2005, C179-C182.
Kudo, et al., "Heterogeneous photocatalyst materials for water splitting", 2009 Renewable Energy issue, Chemical Society Reviews, Oct. 2008, 253-278.
Kumar, et al., "Tuning Ultrafast Photoresponse of Gold Nanorods", Plasmonics, 2013, 1477-1483.
Lin, et al., "Size dependency of nanocrystalline TiO2 on its optical property and photocatalytic reactivity exemplified by 2-chlorophenol", Elsevier, Science Direct, 2006, 1-11.
Lu, et al., "Integrating Plasmonic Nanoparticles with TiO2 Photonic Crystal for Enhancement of Visible-Light-Driven Photocatalysis", Environmental Science & Technology, 2012, 1724-1730.
Michikazu, et al., "Cu2O as a photocatalyst for overall water splitting under visible light irradiation", Chem. Commun, 1998, 357-358.
Mingxia, et al., "TiO2 nanowires sensitized with CdS quantum dots and the surface photovoltage properties", Materials Letters, 2010, 1688-1690.
Nadeem, et al., "Photoreaction of ethanol on Au/TiO2 anatase: Comparing the micro to nanoparticle size activities of the support for hydrogen production", Journal of Photochemistry and Photobiology A: Chemistry 216, 2010, 250-255.
Nadeem, et al., "The photoreaction of TiO2 and Au/TiO2 single crystal and powder with organic adsorbates", ResearchGate, Jan. 2012, 121-162.
Paracchino, et al., "Highly active oxide photocathode for photoelectrochemical water reduction", Articles, nature materials, Jun. 2011, 456-461.
Paulose, et al., "Anodic Growth of Highly Ordered TiO2 Nanotube Arrays to 134 im in Length", The Journal of Physical Chemistry B Letters, 2006, 16179-16184.
Shen, et al., "TiO2 Nanobelts/CdSSe Quantum Dots Nanocomposite", J. Phys. Chem., 2007, 10389-10393.
Vijayalakshmi, et al., "Synthesis and characterization of nano-TiO2 via different methods", Scholars Research Library, 2012, 1183-1190.
Wei-Yun, et al., "Cu2O-decorated CdS nanostructures for high efficiency visible light driven hydrogen production", International Journal of hydrogen energy, 2013, 9665-9672.
Zaleska, "Doped-TiO2: A Review", Recent Patents on Engineering, 2008, 157-164.
Zhi, et al., "Janus Au-TiO2 Photocatalysts with Strong Localization of Plasmonic Near-Fields for Efficient Visible-Light Hydrogen Generation", Advanced Materials, 2012, 2310-2314.
Zhonghai, et al., "Plasmonic Gold Nanocrystals Coupled with Photonic Crystal Seamlessly on TiO2 Nanotube Photoelectrodes for Efficient Visible Light Photoelectrochemical Water Splitting", Nano Letters, 2013, 14-20.

* cited by examiner

CATALYTIC STRUCTURES AND METHODS OF GENERATING HYDROGEN GAS

CROSS-REFERENCE TO RELATED APPLICATION

This application is the National Stage of International Application No. PCT/IB2015/001832, filed 4 Aug. 2015, which claims the benefit of and priority to U.S. Provisional Application Ser. No. 62/032,672, having the title "CATALYTIC STRUCTURES AND METHODS OF GENERATING HYDROGEN GAS," filed on 4 Aug. 2014, the entire disclosures of which are incorporated by reference in their entireties as if fully set forth herein.

TECHNICAL FIELD

The present disclosure generally relates to photocatalytic hydrogen production and catalysts for use therein.

BACKGROUND

Photocatalytic hydrogen production from water has been pursued for over four decades now since the pioneering work of Fujishima and Honda [1]. Over five hundred different catalysts have been designed and tested; most are given in review articles [2-5]. All rely on electron excitation from the valence band to the conduction band followed by electron transfer from the conduction band to ultimately reduce hydrogen ions and to the valence band to oxidize oxygen anions. Among the many semiconductors tested is $TiO_2$ in its different phases [6], sizes [7-9] and shapes [10-12]. While it is probably the most stable known semiconductor under reaction conditions for hydrogen production it absorbs light only in the UV (i.e. up to a maximum of about 5% of the total solar photons hitting the earth). Therefore much work has been conducted to extend its light absorption range into the visible region.

These modifications include doping with anions (such as N, S, or C anions [13])—to decrease the band gap energy by raising the VB maximum level, deposition of metals, such as Au, absorbing in the visible light (surface plasmon resonance) [14-18], as well as deposition of semiconductors that absorb in the visible light range [19, 20]. In that regard, $Cu_2O$ has an excellent potential because the position of its band gap energy falls well in the middle of the solar energy flux [21] and its band edges are appropriate for both oxidation and reduction sides of the photoreaction [23, 24]. However, it has been recognized early on that Cu cations in $Cu_2O$ are not stable. Their oxidation and reduction potentials lie in between the gap energy and, therefore, $Cu^+$ ions can be reduced to Cu metal and oxidized to $Cu^{2+}$ cations. Both (the metal and the $Cu^{2+}$ cations) decrease the activity and ultimately $Cu_2O$ becomes inactive.

Previous work has attempted to change the crystal morphology of $Cu_2O$ to make it more stable. In particular certain crystal shapes have shown promise as they could withstand corrosion; i.e. depending on their crystallographic orientation. In that respect $Cu_2O$ (111) oriented surfaces have shown good activity for electron transfer (current intensity) as well as stability [24]. One of the reasons invoked is the lower resistivity values for films with a stronger (111) orientation [25] where the carrier concentration was higher by almost 2 orders of magnitude for (111)-oriented films when compared to (100); both orientations have similar charge carriers mobility.

There continues to be a need, however, for stable highly active catalytic structures suitable for use in generating hydrogen from water.

SUMMARY

The present disclosure is directed to providing stable highly active catalysts for use in production of hydrogen from water. In an embodiment, the present disclosure provides semiconductor catalysts composed of $Cu_2O$ deposited on $TiO_2$ (of its different polymorphs). In one or more aspects the catalysts can be $Au/Cu_2O$ deposited on $TiO_2$ (of its different polymorphs). In an embodiment, a method for making hydrogen from water using the semiconductor catalysts is also provided.

In various aspects, the catalysts can be dispersed on the surface of the metal oxides (for example $TiO_2$) in nano size while making a strong contact. High production rates are seen for particular cyrstals of Cu2O exposing {111} facets.

In various aspects, we provide catalysts in the form of $Cu_2O$ crystals with the (111) orientation on which Au particles are deposited then mixed with $TiO_2$ (anatase) as well as (anatase+rutile) and methods for the photocatalytic hydrogen production from water in presence of organic sacrificial agents (such as ethylene glycol). The prepared materials were found to be highly active and stable for the reaction.

In an embodiment a photocatalytic structure is provided. The photocatalytic structure can comprise: a $TiO_2$ substrate; and a $Cu_2O$ crystal composite disposed on the $TiO_2$ substrate. The $TiO_2$ substrate can be in the anatase phase. The $TiO_2$ substrate can have a first dimension (e.g., longest dimension) of about 10 nm to 100 nm, preferably about 20 nm to 40 nm.

In any one or more aspects, the $Cu_2O$ crystal of the photocatalytic structure can have a polygonal shape. The polygonal shape can be selected from the group consisting of octahedron, truncated octahedron, cubic and multiply twinned shapes. The $Cu_2O$ crystal can have a first dimension (e.g., longest dimension) of about 250 to 750 nm, preferably about 400 to 600 nm.

In any one or more aspects, the $Cu_2O$ crystal of the photocatalytic structure can have exposed facets of {100}, {110}, {210} and {311} or a mixture thereof. The $Cu_2O$ crystal can have an octahedron crystal structure with the {111} facet exposed. The $Cu_2O$ crystal can be about 1 to 10 weight percent, preferably about 2 to 8 weight percent of the photocatalytic structure.

In any one or more aspects, the $Cu_2O$ crystal composite can have Au particles disposed on the surface of a v $Cu_2O$ crystal. The Au particle(s) can have a structure selected from: spherical, semi-spherical, polygonal, multiply twinned. The Au particle can have a first dimension (e.g., a longest dimension) of about 5 to 50 nm, preferably about 5 to 15 nm. The Au particles can be about 5 to 10 weight percent, preferably about 7 to 9 weight percent of the $Cu_2O$ crystal composite. About 250 to 1000 Au particles can be disposed on the surface of the $Cu_2O$ crystal. The Au particle can be substituted with another metal particle selected from the group consisting of a Pd particle, a Pt particle, a Rh particle, a Ru particle, and an Ir particle.

In one or more embodiments, the photocatalytic structure in any of its aspects can be used to split $H_2O$ to produce $H_2$.

In an embodiment, a method of splitting $H_2O$ to generate $H_2$ is provided. The method can comprise: providing a photocatalytic structure of claim 1 or 2; introducing an aqueous solution to the photocatalytic structure so that the aqueous solution contacts the $Cu_2O$ crystal composite, wherein the aqueous solution includes a sacrificial agent; and exposing the photocatalytic structure to a light source, wherein the aqueous solution and the photocatalytic structure interact to produce $H_2$ from the aqueous solution. The sacrificial agent can be selected from the group consisting of: ethylene glycol, ethanol, methanol, and a combination thereof. The sacrificial agent can act as a hole scavenger. Sacrificial agent can be about 1 to 20 or about 5 to 10 volume percent of the aqueous solution. The light can be artificial and/or natural light. In any one or more aspects, the light can be visible, UV, or a combination thereof. The light can be produced by a light source such as a light bulb. Optionally, a filter can be used to control the wavelength of the light that contacts the photocatalytic structure and the aqueous solution.

In an embodiment, a method of making a photocatalytic structure is provided. The method can comprise: mixing $Cu_2O$ particles with $TiO_2$ particles to form a first mixture; dissolving the $Cu_2O$ particles and the $TiO_2$ particles in an alcohol (e.g., ethanol) to form a second mixture; sonicating (e.g., about 2 min to 60 min) the second mixture; and evaporating the alcohol to form the photocatalytic structure.

In an embodiment, a method of making a photocatalytic structure is provided. The method can comprise: mixing the $Cu_2O$ particles with a precursor gold mixture (e.g., $HAuCl_4$) to form a mixture including $Cu_2O/Au$ particles; mixing $Cu_2O/Au$ particles with $TiO_2$ particles to form a first mixture; dissolving the $Cu_2O/Au$ particles in an alcohol (e.g., ethanol) to form a second mixture; sonicating (e.g., about 2 min to 60 min) the second mixture; and evaporating the alcohol to form the photocatalytic structure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Described below are various embodiments of the present catalytic structures and methods of generating hydrogen gas using the catalytic structures. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic inorganic chemistry, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in °C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

Anatase is a form of a $TiO_2$ mineral found as small, isolated, and faceted crystals that has a tetragonal ditetragonal dipyramidal crystal structure.

A photocatalytic structure is a structure that can absorb photons (light) that accelerate a catalytic reaction, usually at the surface of the material.

Description

Embodiments of the present disclosure include photocatalytic structures, methods of making these structures, methods of making photocatalysts, methods of of producing $H_2$, and the like. An advantage of the present disclosure is that the structures can be used to catalyically form hydrogen ($H_2$) from water when exposing the structure to light while in the presence of a sacrificial agent. In particular, embodiments of the present disclosure have a high hydrogen production rate and use a stable catalyst. In addition to finding use in the production of hydrogen, embodiments of the photocatalytic structure may find use in the semiconductor industry.

An embodiment of the present disclosure includes a photocatalytic structure that includes a $TiO_2$ substrate having $Cu_2O$ crystal composites disposed thereon. The $Cu_2O$ composite can have Au particles disposed on the surface of the $Cu_2O$ crystal. In an embodiment, Au particles (e.g, about 10 nm in diameter) can be grown on the surface of the $Cu_2O$ crystal (e.g., about 500 nm across).

In an embodiment, the $TiO_2$ substrate can have a shape such as spherical, semi-spherical, polygonal, or an arbitrary shape. In an embodiment, the $TiO_2$ substrate is in the anatase phase. In an embodiment, the $TiO_2$ substrate can have a first dimension (e.g., longest dimension, such as diameter for a spherical particle) of about 10 nm to 100 nm or about 20 nm to 40 nm. In an embodiment, the $TiO_2$ substrate can have about 2 wt % to 8 wt % $Cu_2O$ crystal composites disposed thereon.

In an embodiment, the $Cu_2O$ crystal can have a shape such as a polygonal shape (e.g., octahedron, truncated octahedron, cubic and multiply twinned). In an embodiment, the $Cu_2O$ crystal can have a first dimension (e.g., longest dimension, such as diameter for a spherical particle) of about 250 to 750 nm or about 400 to 600 nm. In an embodiment, the $Cu_2O$ crystal can have a crystal structure such as an octahedron crystal structure with the {111} facet exposed. $Cu_2O$ can also have exposed facets of {100}, {110}, {210} and {311} or a mixture thereof. In an embodiment, the $Cu_2O$ crystal can be about 1 to 10 weight percent or about 2 to 8 weight percent of the photocatalytic structure.

In an embodiment, the Au particle can have a structure selected from: spherical, semi-spherical, polygonal, multiply twinned, and the like. In an embodiment, the Au particle can have a first dimension (e.g., longest dimension, such as diameter for a spherical particle) of about 5 to 50 nm or about 5 to 15 nm. In an embodiment, the Au particles can be about 5 to 10 weight percent or about 7 to 9 weight percent of the $Cu_2O$ crystal composite. In an embodiment, about 250 to 1000 Au particles can be disposed on the surface of the $Cu_2O$ crystal.

In an embodiment, the Au particle can be substituted with another metal particle such as a Pd particle, a Pt particle, a Rh particle, a Ru particle, a Ir particle and the like. The dimensions of the metal particles can have the same dimensions of the Au particles.

As mentioned above, an embodiment of the present disclosure provides for methods of forming hydrogen gas from water. In an embodiment, the method can include introducing an aqueous solution to the photocatalytic structure so that the aqueous solution contacts the $Cu_2O$ crystal composite. In an embodiment, the aqueous solution includes a sacrificial agent. The photocatalytic structure and the aqueous solution are exposed to light, where a catalytic reaction occurs to form hydrogen gas.

Figure 1:
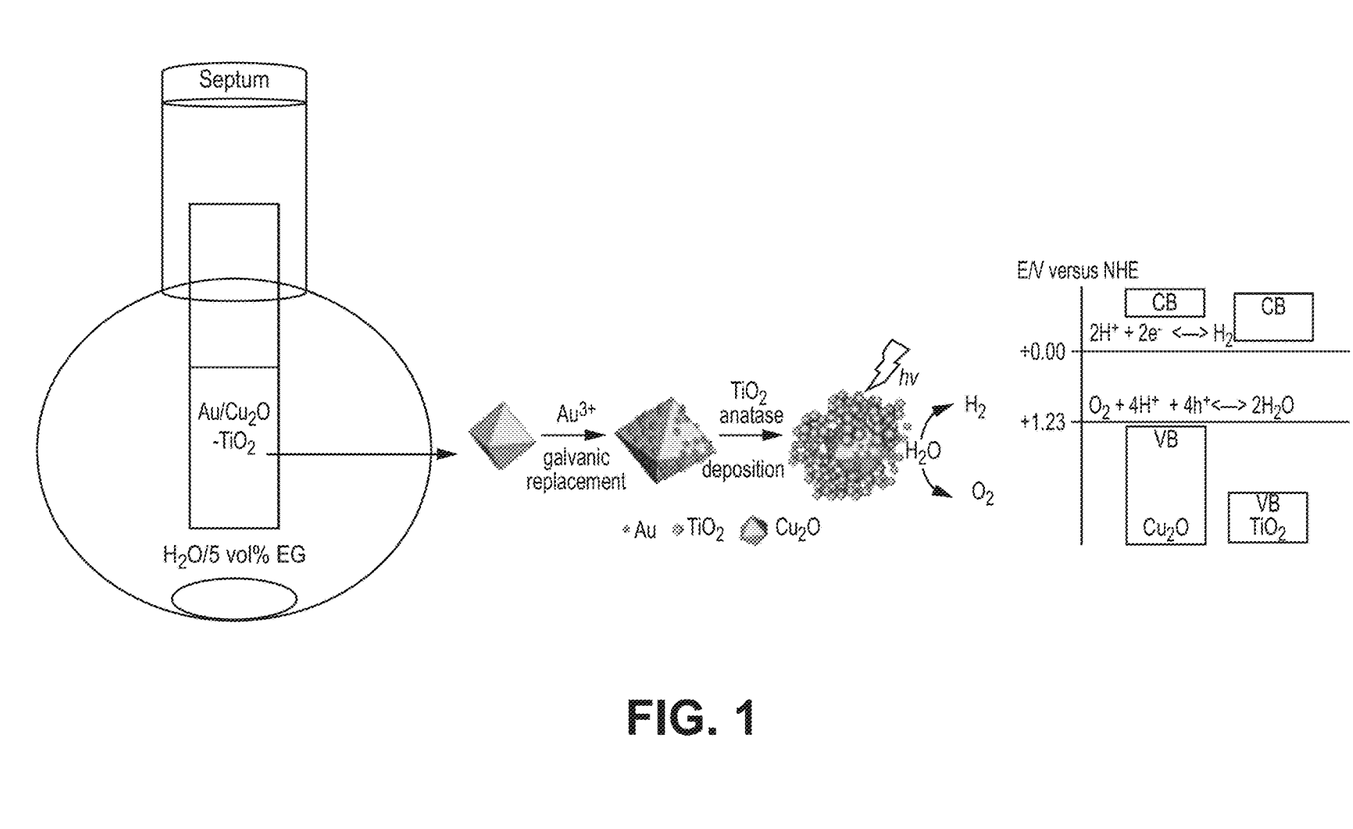
FIG. 1 illustrates a schematic of the formation of a hetero-junction system of $Cu_2O$, Au, and $TiO_2$ particles (left) that can be used to produce $H_2$ and a schematic of the band potentials that illustrate that electrons tend to transfer from the conduction band of $Cu_2O$ to that of $TiO_2$ resulting in $H_2$ production.

FIG. 1 depicts a non-limiting scheme describing a catalytic reaction of the present disclosure. Although not intending to be bound by theory, a mechanism that could lead to the high production rate of $H_2$ can be ascribed to the hetero-junction system between $Cu_2O$, Au and $TiO_2$. Due to the different size and shape of the $Cu_2O$, Au and $TiO_2$ particles, it is possible to create good contacts between all three systems creating a hetero-junction system. Contact between $Cu_2O$ and $TiO_2$ creates a p-n junction system that can facilitate the charge separation. At the interface region of $Cu_2O$ and $TiO_2$, an inner electric field can be formed, so then at the equilibrium, $Cu_2O$ region can be negatively charged and $TiO_2$ region can be positively charged. Under irradiation, electrons and holes can be created in each semiconductor depending on the irradiation spectrum. Based on the band potential of $Cu_2O$ and $TiO_2$ and due to the inner electric field at the interface, photogenerated electrons tend to transfer from the conduction band of $Cu_2O$ to that of $TiO_2$ resulting in $H_2$ production. On the other hand, photogenerated holes can be accumulated in the valence band of $Cu_2O$ or $TiO_2$ and generate $O_2$. In the presence of oxygen, photogenerated holes can also generate hydroxyl radicals that could oxidize the sacrificial agent (e.g., ethylene glycol) and lead to the formation of $CO_2$ and $H_2O$. The system is thus poised to reduce the electron-hole recombination rate and therefore increase the $H_2$ production. The presence of gold in some area can also create Schottky-contact between the p-n junction of $Cu_2O$ and $TiO_2$, facilitating charge carrier transfer and also employing plasmonic resonance to increase the absorption of photons. Although not intending to be bound by theory, transformation of $Cu_2O$ into $Cu(0)$ under irradiation is considered to occur only on the surface of $Cu_2O$ and creates Schottky-contact in the system providing a stable high photocatalytic reaction.

The function of the sacrificial agent is to reduce the recombination of photoexcited electrons and holes. The sacrificial agent can act as a hole scavenger. In the absence of hole scavengers, photogenerated electrons and holes tend to recombine very quickly (in 10-100 ns) and dissipate the energy into heat. In an embodiment, the sacrificial agent can be ethylene glycol, methanol, ethanol, glycerol or a combination thereof. In an embodiment, the sacrificial agent can be about 1 to 20 or about 5 to 10 volume percent of the aqueous solution.

In an embodiment, the light can be artificial and/or natural light. In an embodiment, the light can be visible, UV, or a combination thereof. In an embodiment, the light can be produced by a light source such as a light bulb. Optionally, a filter can be used to control the wavelength of the light that contacts the photocatalytic structure and the aqueous solution.

In an embodiment, a method of making a photocatalytic structure can include mixing $Cu_2O$ particles with $TiO_2$ particles to form a first mixture (e.g., in an alcohol such as ethanol). Next, the $Cu_2O$ particles and the $TiO_2$ particles can be dissolved in an alcohol (e.g., ethanol) to form a second mixture. Subsequently, the second mixture can be sonicated (e.g., about 2 min to 60 min). The second mixture can be disposed on a surface such as glass and the alcohol can be evaporated to form the photocatalytic structure. Additional details are provided in Example 1.

In an embodiment, a method of making a photocatalytic structure can include mixing the $Cu_2O$ particles with a precursor gold mixture (e.g., $HAuCl_4$) to form a mixture including $Cu_2O$/Au particles. Next, $Cu_2O$/Au particles can be mixed with $TiO_2$ particles to form a first mixture (e.g., an alcohol such as ethanol). Subsequently, the $Cu_2O$/Au particles can be dissolved in an alcohol (e.g., ethanol) to form a second mixture. The second mixture can be sonicated (e.g., about 2 min to 60 min). The second mixture can be disposed on a surface such as glass and the alcohol can be evaporated to form the photocatalytic structure. Additional details are provided in Example 1.

EXAMPLE

Example 1

This Example describe the preparation of $Cu_2O$ crystals with the {111} facet exposed on which Au particles are deposited and then mixed with $TiO_2$ substrates having a phase anatase as well as $TiO_2$ substrates having an anatase phase. These were tested for the photocatalytic hydrogen production from water in presence of organic sacrificial agents (e.g., ethylene glycol). The prepared materials were found to be highly active and stable, for the reaction.

FIGS. 2(a)-2(d) present Scanning Electron Microscopy (SEM) and Transmission Electron Microscopy (TEM) images of Au/$Cu_2O$ crystals. Octahedron crystals with only the {111} facets exposed are seen in the SEM image. Au particles of about 10 nm in size are evenly dispersed on the $Cu_2O$ crystals of about 500 nm (TEM). Also as can be seen in the X-ray diffraction (XRD) the predominant orientation of the crystals is the [111] direction.

Figure 2A:
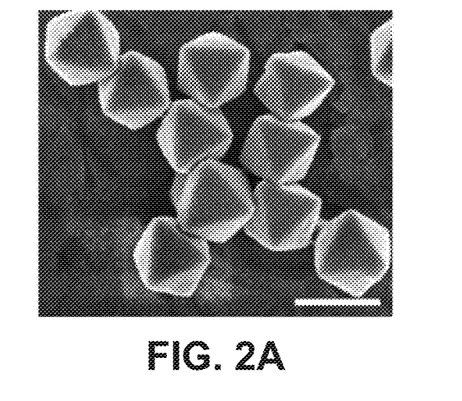
FIGS. 2(a)-2(d) depict a SEM image of $Cu_2O$ octahedron nanoparticles before (FIG. 2(a)) and after (FIG. 2 (b)) galvanic replacement reaction with Au (scale bar is 500 nm), and their corresponding UV-Vis absorption spectra (FIG. 2 (c)) and XRD (FIG. 2 (d)).
Figure 2B:
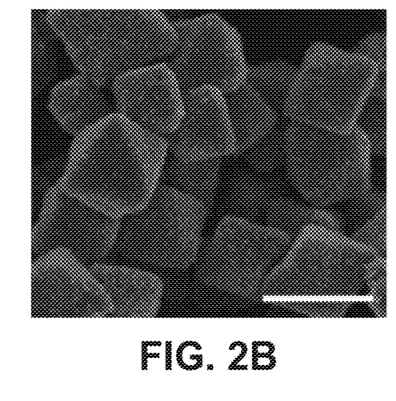
Figure 2C:
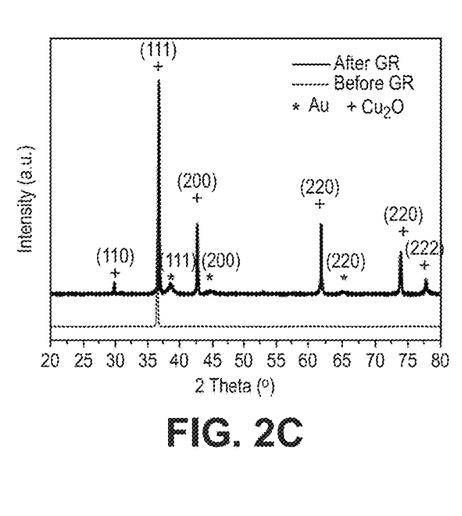
Figure 2D:
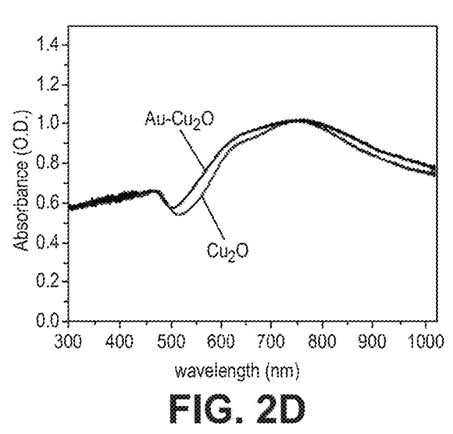

FIG. 2(a) shows an SEM image of obtained $Cu_2O$ NCs which are octahedral in shape, bound by the {111} facet with the particle size of around 475±20 nm. SEM image of the particles after galvanic replacement reaction shows some Au nanoparticles are deposited on the surface of $Cu_2O$ NCs (FIG. 2(b)). The addition of gold salt solution into $Cu_2O$ solution was done by partial galvanic replacement method. The idea is to increase the absorption and charge carriers transport in the $Cu_2O$—$TiO_2$ hetero-junction system. FIG. 2(c) shows the XRD pattern of $Cu_2O$ before and after galvanic replacement reaction with Au. Before galvanic replacement, we can see a dominant (111) peak of $Cu_2O$, indicating orientation of the particles in the [111] direction. After the galvanic replacement, XRD pattern show the Au spectra indicating the addition of Au onto $Cu_2O$. Optical characterization using UV-Visible spectroscopy also shows increasing the absorption after deposition of Au nanoparticles (FIG. 2(d)).

Figure 3A:
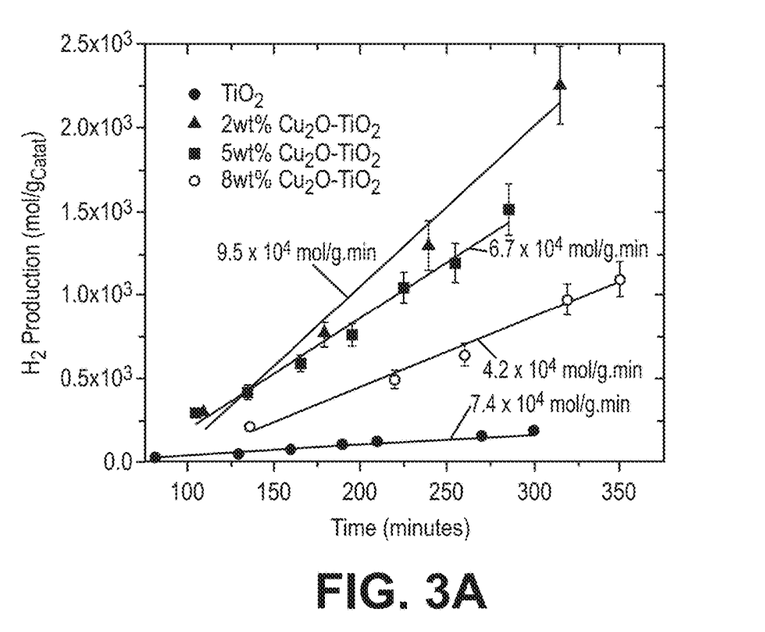
FIGS. 3(a)-3(b) depict an evaluation of photocatalytic production of $H_2$ over $TiO_2$, $Cu_2O/TiO_2$ (FIG. 3(a)) and over Au—$Cu_2O/TiO_2$ (FIG. 3(b)).
Figure 3B:
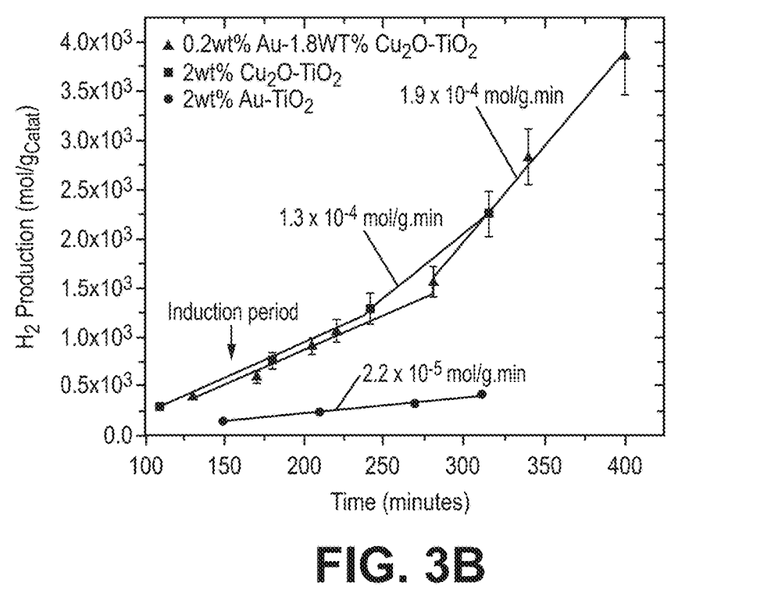

FIGS. 3(a)-3(b) present an example of the photoreaction activity. The initial catalyst is composed of 2 mg of Au/$Cu_2O$ deposited on 98 mg of $TiO_2$ (anatase); or with nominal Au wt. % of 0.2% and nominal $Cu_2O$ particles of 1.8 wt. %. It can be seen that adding Au/$Cu_2O$ to $TiO_2$ (anatase) increases its activity by about two orders of magnitude.

The initial study of $Cu_2O$ NCs for increasing the performance of $TiO_2$ in water splitting process is shown in FIG. 3(a). The mixed catalyst shows at least about 4 to 5 times faster rate compared to $TiO_2$ alone with the lowest loading of 2 wt % of $Cu_2O$ having the largest $H_2$ production weight normalized for photo-catalysis.

FIG. 3(b) shows the comparison of $H_2$ that can be produced from 2 wt. % of $Cu_2O$ and Au—$Cu_2O$. It is shown that addition of Au results in two-fold increase of the $H_2$ production rate. Catalyst stability can be seen also from the linear hydrogen production with time. We have also compared the Au/$Cu_2O${111}/$TiO_2$ to 2 wt % of Au deposit onto the same $TiO_2$ by wet impregnation method, our catalyst has higher production rate. Sample of 2 wt. % Au—$TiO_2$ gave production rate $2.2 \times 10^{-5}$ mol/$g_{Catal}$·min., suggesting that Cu2O can be used to overcome expensive noble metals.

EXPERIMENTAL

Materials Synthesis
Chemicals:

Copper (II) chloride anhydrous powder (Cu $Cl_2$, ≥99.995%), Polyvinylpirrolidone (PVP, MW ca. 55K), Sodium borohydride ($NaBH_4$, ≥98.0%) and Gold (III) chloride hydrate ($HAuCl_4 \cdot xH_2O$, 99.999%) were purchased from Sigma-Aldrich. All chemicals were used as received without further purification. Ultrapure MilliQ water (18.3Ω) and Ethanol absolute (≥99.8%, Sigma-Aldrich) were used for solution preparation.

Synthesis of $Cu_2O$ Octahedron:

In a typical synthesis, 4 mL of 10 mM $CuCl_2$ aqueous solution and 4 mL of 100 mM PVP aqueous solution were added into 20 ml glass vial. This mixture was stirred at room temperature and capped. During the reaction, vial was kept closed except for the addition of $NaBH_4$ solution. After 30 minutes, 2 mL of 40 mM of $NaBH_4$ aqueous solution was added into the vial and recapped after 1 minute. Upon addition of $NaBH_4$, color of the solution changed from brown to yellow during the first hour of the reaction, hinting the oxidation from Cu to $Cu_2O$ state.

The reducing agent can be, but is not limited to; $NaBH_4$, $LiBH_4$, $NaBH_3CN$, Solid supported borohydrides, $H_2$ gas or electrochemical oxidation.

The reaction was stopped after 6 hours, and the product was washed and centrifuged three times with ethanol for 15 minutes @ 7500 rpm. The washed $Cu_2O$ NCs were re-dissolved in 10 mL of ethanol for the usage in galvanic replacement reaction. The reaction can be scaled up for larger quantity by using 100 or 250 mL vials, with maximum volume of total solution is 50% of the volume of vial to ensure enough oxygen for oxidation.

Partial Galvanic Replacement Reaction to form $Cu_2O$—Au:

For the partial galvanic replacement reaction, 10 mL of the purified $Cu_2O$ NCs in ethanol solution were stirred in 20 mL glass vials. 1 mL of 1 mM $HAuCl_4$ in ethanol solution was added into the $Cu_2O$ NCs solution. $HAuCl_4$ solution can be prepared at least 7 days before using. During the reaction, color of the solution changed from yellow to dark yellow in 3-5 minutes, and finally turned green after ca. 10 minutes. The mixture was kept stirred and capped for 30 minutes then washed with ethanol in twice. Finally, the obtained $Cu_2O$—Au nanocrystals were dried under vacuum condition for further using in photocatalytic studies.

Photo Catalytic Reaction:

$Cu_2O$ or Au—$Cu_2O$ NCs were mixed with $TiO_2$ NCs in ratio of 2 wt %, 5 wt %, and 8 wt %. The mixed NCs were dissolved in ethanol and sonicated for 5 minutes. In typical preparation, 2 mg of $Cu_2O$ or $Cu_2O$—Au NCs and 98 mg of $TiO_2$ were mixed in 40 mL of ethanol to obtain 2 wt % of $Cu_2O$ or $Cu_2O$—Au ratio. The mixed catalysts in ethanol were deposited onto a glass substrate (microscope slides Fisherbrand, cut size: 75×18×1 mm) by evaporating the catalyst solutions inside a petri dish in the fume hood. Before deposition, the glass substrates were dipped in iso-propanol and sonicated for 10 minutes, and then followed by plasma cleaning for 10 minutes. After evaporation, the substrates were put in the oven @ 100° C. for 15 minutes. In each set of experiment, the catalysts were deposited on the glass which the amount was controlled to be nearly similar.

Catalysts were evaluated for hydrogen production in a 250 mL volume of Wilmad Lab glass reactor. Milli-Q deionized water (170 mL) and ethylene glycol (8.5 mL i.e. 5% by volume) were added into the reactor. After that, the deposited catalyst on the glass substrate was placed inside the reactor and sealed with septum. The reactor was purged with nitrogen gas for 15-20 minutes in order to replace air inside the reactor. The reactor was then placed in front of the UV light source with the deposited glass substrate facing into the light source. The reactor was exposed to the UV light; a 100 Watt ultraviolet lamp (H-144GC-100, Sylvania par 38) was used as a UV source with a flux of ca. 12 $mW/cm^2$ at a distance of 5 cm with the cut off filter (360 nm and above). Product analysis was performed by Gas Chromatograph (GC) equipped with Thermal Conductivity Detector (TCD) connected to Porapak Q packed column (2 m) at 45° C. and $N_2$ was used as a carrier gas.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding based on numerical value and the measurement techniques. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

REFERENCES

1. A. Fujishima, and K. Honda, Nature, Vol. 238, 37 (1972).
2. A. Kudo and Y. Miseki, Chem. Soc. Rev. 38, 253 (2009).
3. M. A. Nadeem, K. A. Connelly and H. Idriss, Int. J. Nanotechnology. Special edition on Nanotechnology in Scotland, 9, 121-162 (2012)
4. K. A. Connelly and H. Idriss, Green Chemistry, 14 (2), 260-280 (2012)
5. J. P. Best, D. E. Dunstan, Int. J. Hyd. Energy, 34, 7562-7578 (2009)
6. K. Connelly, A. K. Wahab, H. Idriss, Mater Renew Sustain Energy 1, 1-12 (2012)
7. M. A. Nadeem, M. Murdoch, G. I. N. Waterhouse, J. B. Metson, M. A. Keane, J. Llorca, H. Idriss, J. PhotoChem & PhotoBio A: Chemicals, 216, 250-255 (2010)
8. R. Vijayalakshmi and V. Rajendran, Archives of Applied Science Research, 2012, 4 (2):1183-1190
9. H. Lin, C. P. Huang, W. Li, C. Ni, S. Ismat Shah, Y.-H. Tseng, Applied Catalysis B: Environmental 68 (2006) 1-11
10. M. Paulose, K. Shankar, S. Yoriya, H. E. Prakasam, O. K. Varghese, G. K. Mor, T. A. Latempa, A. Fitzgerald, C. A. Grimes, J. Phys. Chem. B, 2006, 110, 16179-16184.
11. A. V. Korzhak, N. I. Ermokhina, A. L. Stroyuk, V. K. Bukhtiyarov, A. E. Raevskaya, V. I. Litvin, S. Ya. Kuchmiy, V. G. Ilyin, P. A. Manorik, Journal of Photochemistry and Photobiology A: Chemistry 198 (2008) 126-134
12. S. V. Chong, N. Suresh, J. Xia, N. Al-Salim, H. Idriss, J. Phys. Chem. C 111, 10389-10393 (2007).
13. A. Zaleska, Doped-$TiO_2$: A Review, Recent Patents on Engineering 2008, 2, 157-164
14. S. Kumar, M. Anija, A. K. Sood, Plasmonics (2013) 8:1477-1483
15. Y. Lu, H. Yu, S. Chen, X. Quan, H. Zhao, Environ. Sci. Technol. 2012, 46, 1724-1730
16. Z. Zhang, L. Zhang, M. N. Hedhili, H. Zhang, P. Wang, Nano Lett. 2013, 13, 14-20
17. S. K. Cushing, J. F. Meng, T. R. Senty, S. Sun, M. Zhi, M. Li, A. D. Bristow, N. Wu, J. Am. Chem. Soc. 2012, 134, 15033-15041.
18. Z. W. Seh, S. Liu, M. Low, S.-Y. Zhang, Z. Liu, A. Mlayah, M.-Y. Han, Adv. Mater. 2012, 24, 2310-2314
19. W-Y. Cheng, T.-H. Yu, K.-J. Chao, S.-Y. Lu, Int. J. Hydr. Energy (2013)
20. M. Xia, F. Wang, Y. Wang, A. Pan, B. Zou, Q. Zhang, Y. Wang, Mater. Lett. 64 (2010) 1688-1690
21. H. Gericsher, J. Electro. Anal. Chem. 82 (1977) 133-143
22. M. Hara, T. Kondo, M. Komoda, S. Ikeda, K. Shinohara, A. Tanaka, J. N. Kondo, K. Domen, Chem. Commun., 1998, 357-358.
23. A. Paracchino, J. C. Brauer, J.-E. Moser, E. Thimsen, M. Graetzel, J. Phys. Chem. C 116, 7341-7350, (2012)
24. A. Paracchino, V. Laporte, K. Sivula, M. Graetzel, E. Thimsen, Nature Materials 10, 456-461 (2011)

25. K. Mizuno, M. Izaki, K. Murase, T. Shinagawa, M. Chigane, M. Inaba, A. Tasaka, Y. Awakura, J. Electrochem. Soc. 2005, 152 (4), C179-C182.

The invention claimed is:

1. A photocatalytic structure comprising:
a p-n junction formed between a $TiO_2$ substrate in contact with a $Cu_2O$ crystal of a $Cu_2O$ crystal composite,
wherein the $Cu_2O$ crystal composite is obtained by depositing Au nanoparticles having a longest dimension within a range of about 5 to 50 nm on a surface of the $Cu_2O$ crystal via galvanic replacement;
wherein the $Cu_2O$ crystal is an octahedron having a longest dimension within a range of 400 to 600 nm and the surface deposited with Au nanoparticles is an exposed facet of the $Cu_2O$ crystal.

2. The photocatalytic structure of claim 1, wherein the $TiO_2$ substrate is in the anatase phase.

3. The photocatalytic structure of claim 1, wherein the $TiO_2$ substrate has a longest dimension of about 10 nm to 100 nm.

4. The photocatalytic structure of claim 3, wherein the $TiO_2$ substrate has a longest dimension within a range of about 20 nm to 40 nm.

5. The photocatalytic structure of claim 1, wherein the Au nanoparticles have a structure selected from the group consisting of spherical, semi-spherical, polygonal, and multiply twinned nanoparticles.

6. The photocatalytic structure of claim 1, $Cu_2O$ crystal composite comprises about 5 to 10% by weight Au nanoparticles.

7. The photocatalytic structure of claim 1, wherein about 250 to 1000 Au nanoparticles are disposed on the surface of the $Cu_2O$ crystal.

8. The photocatalytic structure of claim 1, wherein the Au nanoparticles have a longest dimension of about 5 to 15 nm.

9. The photocatalytic structure of claim 1, comprising about 1 to 10% by weight $Cu_2O$ crystal composites.

10. The photocatalytic structure of claim 1, wherein a weight ratio of $TiO_2$ substrates and $Cu_2O$ crystal composites is within a range of 98:2 to 92:8.

11. The photocatalytic structure of claim 1, wherein the longest dimensions of the Au nanoparticles and the $Cu_2O$ crystal is different than a longest dimension of the $TiO_2$ substrate.

12. The photocatalytic structure of claim 11, wherein a shape of the Au nanoparticles, the $TiO_2$ substrate and the $Cu_2O$ crystal are different from each other.

13. A method of splitting $H_2O$ to generate $H_2$, comprising:
providing a photocatalytic structure of claim 1;
introducing an aqueous solution to the photocatalytic structure so that the aqueous solution contacts the $Cu_2O$ crystal composite, wherein the aqueous solution includes a sacrificial agent; and
exposing the photocatalytic structure to a light source, wherein the aqueous solution and the photocatalytic structure interact to produce $H_2$ from the aqueous solution.

14. The method of claim 13, wherein the sacrificial agent is selected from the group consisting of: ethylene glycol, ethanol, methanol, and a combination thereof.

15. A method of making the photocatalytic structure of claim 1, comprising:
mixing $Cu_2O$ particles with $TiO_2$ particles to form a first mixture;
dissolving the $Cu_2O$ particles and the $TiO_2$ particles in an alcohol to form a second mixture;
sonicating the second mixture; and
evaporating the alcohol to form the photocatalytic structure.

16. The method of claim 15, comprising:
first mixing the $Cu_2O$ particles with a precursor gold mixture to form a mixture including $Cu_2O$/Au particles; and
wherein the step of mixing $Cu_2O$ particles with $TiO_2$ particles to form the first mixture involves mixing the $Cu_2O$/Au particles with the $TiO_2$ particles to form the first mixture.

* * * * *